United States Patent

[11] 3,589,519

[72] Inventor  Henry Bendel
                3, rue Gautier, 1201 Geneva, Switzerland
[21] Appl. No. 4,584
[22] Filed     Jan. 21, 1970
[45] Patented  June 29, 1971
[73] Assignee  Passavant-Werke
                Michelbach, Hutte, Germany
[32] Priority  Jan. 29, 1969
[33]           Switzerland
[31]           1338/69

[54] GRIT SEPARATING APPARATUS
     10 Claims, 4 Drawing Figs.
[52] U.S. Cl. .................................................. 210/208,
                                                    210/530
[51] Int. Cl. ........................................... B01d 21/24
[50] Field of Search ............................................ 210/523,
                                            527, 528, 530, 208

[56]                References Cited
              UNITED STATES PATENTS
3,396,102   8/1968   Forrest ........................... 210/527 X
3,435,954   4/1969   Ohl et al. ........................ 210/530 X

*Primary Examiner*—J. L. DeCesare
*Attorney*—Larson, Taylor & Hinds

ABSTRACT: Grit separating apparatus comprises an annular settling chamber having a floor which slopes conically downwards to an annular grit collecting channel. A conduit for removing grit extends downwardly through the chamber into the channel and is moved lengthwise of the channel to remove grit therefrom. The conduit is conveniently mounted on a bridge extending radially over the annular chamber and the bridge may serve to support agitating means to move the water through the setting chamber at an effective flow velocity between a raw water inlet port and a treated water outlet port.

PATENTED JUN 29 1971
3,589,519
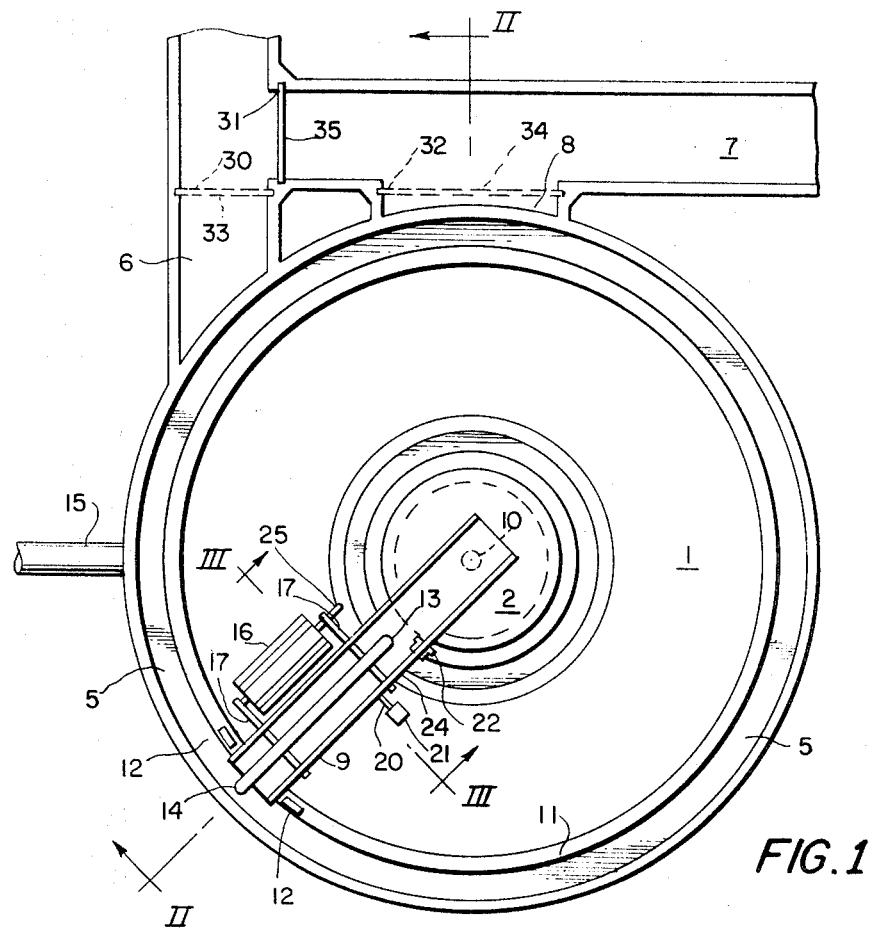
FIG.1
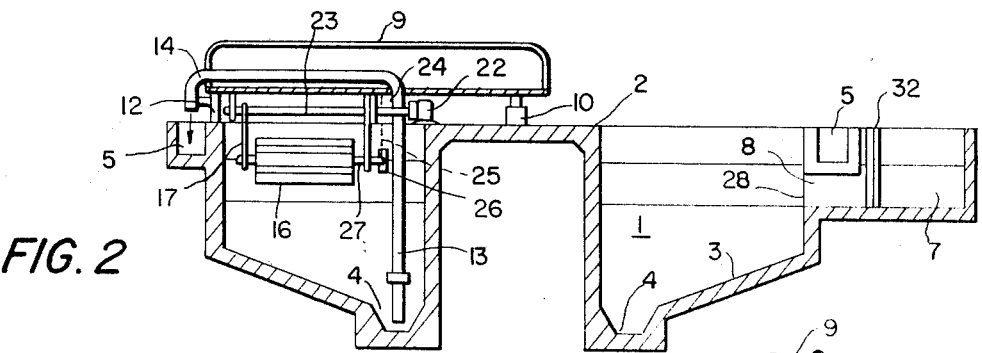
FIG.2
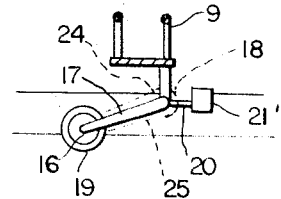
FIG.3
FIG.4
INVENTOR
HENRY BENDEL
BY Larson and Taylor
ATTORNEYS

GRIT SEPARATING APPARATUS

BACKGROUND OF THE INVENTION

This invention relates to apparatus for separating grit and other granular material from waste water.

In the purification of sewage and similar waste liquors, primary settling tanks are used into which the incoming raw sewage is fed and wherein the readily settleable solids are settled out to form a sludge blanket in the lower portion of the settling chamber, the liquid components of the sewage and such solid and colloidal matter as is not thus settled out being conducted away from the upper portion of the primary settling tank for further treatment. The effluent from a primary settling tank of the above character contains an objectionable amount of sand and similar grit, the presence of which is undesirable during subsequent treatments, and accordingly it has been frequently found desirable as a part of the primary treatment, to first pass the sewage through a grit-separation apparatus separate from the primary settling chamber, for the purpose of removing grit therefrom.

The conventional grit chamber units are generally designed in rectangular shape. In order to arrange for a continuous transverse flow of the water and to prevent the organic matter from sedimentation, air blower equipment is used. In order to remove the settled grit over the total length of the basin, a scraping device is provided, e.g. a scraper bridge, which requires a complicated construction accompanied by a relative high power consumption. Another disadvantage of the conventional units is the space required on account of their excessive length.

It is an object of the present invention to provide a grit-separating chamber which is free of the disadvantages mentioned above.

SUMMARY OF THE INVENTION

The foregoing and other objects which will be apparent to those of ordinary skill in the art are achieved according to the present invention by providing apparatus for separating grit and other granular matter from waste water comprising a horizontally disposed annular settling chamber having a central column, a cylindrical outer wall and a conically sloping floor, an annular grit-collecting channel provided in the floor of said tank, said floor sloping conically down towards said channel, inlet means for introducing raw water into said settling chamber, outlet means for removing treated water from said settling chamber, means for moving water through said annular chamber at a flow velocity effective for the separation of grit and other granular matter from the waste water, conduit means extending from said annular grit-collecting channel upwardly through said annular chamber for conveying collected grit out of said settling chamber, means for pumping grit through said conduit means, and means for moving said conduit means lengthwise of said grit-collecting channel.

DETAILED DESCRIPTION

Preferred embodiments of the invention are described in the following detailed description in which:

FIG. 1 is a diagrammatic plan view of apparatus according to the invention;

FIG. 2 is a sectional elevation along the line A–A of FIG. 1;

FIG. 3 is a sectional view of a portion of the device of FIG. 1 taken along the line B–B; and FIG. 4 is a diagrammatic view of a detail alternative to that shown in FIG. 3.

Apparatus according to the invention is characterized in that the settling chamber is generally circular with a center column, thus presenting a chamber of annular design. The floor is conically inclined, terminating in an annular channel which surrounds the center column and forms a trough for collecting the settled grit.

The annular shape of the chamber permits the construction of extremely compact units. The energy necessary for moving the water present in the chamber is relatively low, since the said water is held in constant circulation, namely, constantly in the same direction and without surges.

With reference to the drawings, the grit chamber unit as shown comprises a annular tank 1 having a center column 2, providing the chamber with an annular shape. The floor 3 of the chamber is conically inclined and terminates in an annular-shaped channel 4, which surrounds the center column 2 and forms a collecting trough for the grit settling in the chamber. A circular channel 5 is located around the outside of chamber 1 and is arranged with a higher water level than that which can be reached by the water in the chamber 1. Chamber 1 is provided with a raw water inlet channel 6 and with a discharge channel 7 for the treated water. A lateral opening 8 in the chamber 1 permits discharge of the water in the direction of the said discharge channel 7.

The device also comprises a traveling bridge 9, the axis 10 of which is located in the center of column 2. The said bridge 9, therefore, is designed as a radially extending arm from the center column 2 towards the cylindrical outer wall 11 of the chamber 1, which serves as a support for one set of wheels 12 mounted on bridge 9. A motor (not indicated) serves to drive the wheels 12 in order to cause rotation of the bridge 9 around the chamber 1. Bridge 9 provides a support for a pumping device (not shown) which may be a centrifugal pump or any other type of suitable conventional pump. The discharge conduit 14 of the said pump is so arranged that the grit pumped from channel 4 through conduit 14 is conveyed to the outer channel 5, from where it can be removed through a pipe 15 into a drainage vessel of conventional construction. The intake conduit 13 of the pump extends downwardly from the bridge into channel 4 to remove grit collected therein.

The bridge 9 also provides a support for at least one agitator mounted for rotation therewith and extending downwardly below the water level in the annular chamber. The agitator preferably comprises a rotor 16 supported by arms 17 hinged at 18 for pivoting relative to the bridge 9. Rotor 16 is a floating drum provided with radial extensions 19 of the shovel type. Arms 17 are provided with an extension 20 on which a counter balance 21 is arranged, to partially balance the weight of the rotor 16 such that it may adapt itself to the water level in chamber 1. The drive for the rotation of the drum or of the rotor 16 is effected through a gear motor 22, driving a shaft 23 provided with a sprocket wheel 24. The movement of sprocket wheel 24 is transferred to rotor 16 via a chain 25, inserted on a toothed pinion 26, which is mounted on the shaft 27 of the rotor 16. The design and construction of the bridge 9 may be conventional.

The operation of the grit chamber unit shown and described is as follows: the raw water to be treated enters through inlet channel 6 to the chamber 1. Since channel 6 is tangentially arranged with respect to chamber 1, the incoming water flow provides the liquid contained in the chamber with a certain amount of circulation. The circulation is maintained and can be increased through the agitator, designed as rotor 16, driven by the gear motor 22, mounted on bridge 9 which slowly rotates about the central column 2.

The grit contained in the raw water falls in the direction of the conical floor 3, from where it discharges into the channel 4. The pump supported by bridge 9 draws the water with the grit and conveys the mixture from channel 4 into the outer channel 5, surrounding the chamber 1. From the said channel 5 the grit-water mixture then passes through the pipe 15 into a drainage tank of conventional design. Since the bridge 9 is slowly rotated over the chamber 1, the lower end of conduit 13 continually moves lengthwise of channel 4 and thus uniformly removes all of the grit which has settled in the channel. The water free from grit passes via the weir 28 of the lateral opening 8 of the chamber 1 into the discharge channel 7. The rotor 16, which ensures the water circulation, may simultaneously introduce oxygen or air into the water and thus effect an aeration to regenerate the water (e.g. for removal of sulfuretted hydrogen).

With grit chamber units of large dimensions, the bridge 9, instead of being provided with a radial arm only, may extend diametrically across chamber 1. Each arm designed as a radius of such bridge can then serve as a support for conduit means to convey grit from channel 4 and for agitators, as well as the rotor 16. It is to be noted that the optimum mean velocity of the water flow for the purpose of sedimentation, i.e. for the most efficient removal of grit, is generally between 30 and 40 cm./sec. It has been noted that this velocity encourages sedimentation of the grit on the floor of the chamber without the organic solids settling at the same time. These are conveyed with the discharge to channel 7.

If aeration of the water in chamber 1 is not desired, the agitator system with rotor 16 can be replaced with one or more shovels 29 as shown in FIG. 4, suspended from the bridge 9 and immersed into the water. In this case the rate of advance of the bridge 9 is so chosen, that the mean moving speed of the shovels 29 in the chamber is 30—40 cm./sec.

Guides 30, 31 and 32 are provided each in the inlet channel 6, between channel 6 and the discharge channel 7, as well as at opening 8 of the chamber 1 in channel 7. Guides 30 and 32 are provided for the insertion of plates 33 and 34 respectively, as gates, for instance, for the purpose of closing the inlet channel 6 in the direction of the chamber 1, as well as closing the discharge opening 8 in the direction of channel 7 in the event that it is desired to inspect the device. A gate 35 is provided in guide 31 to separate inlet channel 6 from outlet channel 7.

In the event of extraordinarily large volumes of raw water requiring treatment, several units of this type can be combined in one plant. Where the amount of grit collected in channel 4 is small, it is preferred to pump the grit from channel 4 through conduits 13,14 at a relatively low rate to prevent the withdrawal of treated water. If desired, the pump can be operated intermittently for this purpose and a conventional timer device may be provided to regulate the pumping intervals automatically.

What I claimed is:

1. Apparatus for separating grit and other granular matter from waste water comprising a horizontally disposed annular settling chamber having a central column, a cylindrical outer wall, and a conically sloping floor; an annular grit-collecting channel provided in the floor of said chamber, said floor sloping conically down towards said channel; inlet means for introducing raw water into said settling chamber; outlet means for removing treated water from said settling chamber; agitation means located well above said floor for circulating the water in said annular chamber in an annular flow pattern around said central column and at a flow velocity effective for the separation of grit and other granular matter from the waste water, said flow velocity being sufficient to prevent settling of organic solids in said annular chamber; conduit means extending from said annular grit-collecting channel upwardly through said annular chamber for conveying collected grit out of said settling chamber; means for pumping grit through said conduit means; and means for moving said conduit means lengthwise of said grit-collecting channel for removing grit collected therein.

2. Apparatus according to claim 1 further including a bridge rotatably mounted on said central column and extending radially therefrom over the top of said annular chamber towards said cylindrical outer wall, and means to rotate said bridge.

3. Apparatus according to claim 2 wherein said grit-conveying conduit means is mounted on said bridge for rotation therewith.

4. Apparatus according to claim 2 wherein said bridge is supported by said cylindrical outer wall.

5. Apparatus according to claim 2 further including a further annular channel located outside said annular chamber, said grit-conveying means extending to said further annular channel to convey grit from said annular grit-collection channel to said further annular channel.

6. Apparatus according to claim 2 wherein said agitator means is mounted on said bridge for rotation therewith and extending downwardly below the water level in said annular chamber.

7. Apparatus according to claim 6 further including means for adjusting the height of said agitator means in said annular chamber.

8. Apparatus according to claim 6 wherein said agitator means comprises a floating rotatable drum.

9. Apparatus according to claim 6 wherein said agitator means comprises a baffle.

10. Apparatus according to claim 1 further including means for periodically stopping said grit-pumping means.